United States Patent
Nowak et al.

(10) Patent No.: US 10,917,405 B2
(45) Date of Patent: *Feb. 9, 2021

(54) METHODS AND SYSTEMS FOR PROVIDING FIDO AUTHENTICATION SERVICES

(71) Applicant: Mastercard International Incorporated, Purchase, NY (US)

(72) Inventors: Dawid Nowak, Dublin (IR); Ashley Waldron, Dublin (IR); Ashfaq Kamal, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,206

(22) Filed: Oct. 10, 2019

(65) Prior Publication Data

US 2020/0045046 A1    Feb. 6, 2020

Related U.S. Application Data

(63) Continuation of application No. 15/787,976, filed on Oct. 19, 2017, now Pat. No. 10,469,490.

(51) Int. Cl.
*H04L 29/06* (2006.01)

(52) U.S. Cl.
CPC ...... *H04L 63/0869* (2013.01); *H04L 63/0853* (2013.01); *H04L 63/0892* (2013.01);
(Continued)

(58) Field of Classification Search
CPC .............. H04L 63/0869; H04L 63/101; H04L 63/0853; H04L 63/0892; H04L 63/0861; H04L 63/0428
See application file for complete search history.

(56) References Cited

U.S. PATENT DOCUMENTS 9,231,758 B2 *  1/2016 Bar-El .................. H04L 9/0877
10,075,437 B1 *  9/2018 Costigan ............... G06F 21/316
(Continued)

OTHER PUBLICATIONS

FIDO Alliance, Jun. 29, 2018, "FIDO Authenticator Allowed Cryptography List", pp. 1-8.*

(Continued)

*Primary Examiner* — Robert B Leung
*Assistant Examiner* — Thomas Ho
(74) *Attorney, Agent, or Firm* — Buckley, Maschoff & Talwalkar LLC (57) ABSTRACT

FIDO ("Fast IDentity Online") authentication processes and systems are described. In an embodiment, a FIDO ("Fast IDentity Online") authentication process includes a FIDO information systems (IS) computer system receiving a FIDO authentication request for a transaction from a user device, the FIDO authentication request including user data and user device authenticator data, then verifying the user data and user device authenticator data, selecting a FIDO-certified server based on a list of authorized authenticators, business rules and the user device authenticator data, and transmitting the FIDO authentication request to the selected FIDO server. The process also includes the FIDO IS computer system receiving an authentication result from the FIDO-certified server, and transmitting the authentication result to the user device.

18 Claims, 5 Drawing Sheets

(52) U.S. Cl.
CPC ........ *H04L 63/101* (2013.01); *H04L 63/0428* (2013.01); *H04L 63/0861* (2013.01)

(56) References Cited

U.S. PATENT DOCUMENTS

| | | | | |
|---|---|---|---|---|
| 2002/0076042 A1* | 6/2002 | Sandhu | ............... | H04L 9/30 |
| | | | | 380/30 |
| 2003/0203756 A1* | 10/2003 | Jackson | ............... | G07F 17/32 |
| | | | | 463/42 |
| 2014/0195807 A1* | 7/2014 | Bar-El | ............... | H04L 9/083 |
| | | | | 713/168 |
| 2015/0180869 A1* | 6/2015 | Verma | ............... | H04L 63/0884 |
| | | | | 726/4 |
| 2015/0294313 A1* | 10/2015 | Kamal | ............... | G06Q 20/401 |
| | | | | 705/44 |
| 2016/0005038 A1* | 1/2016 | Kamal | ............... | G06Q 20/405 |
| | | | | 705/44 |
| 2017/0048240 A1* | 2/2017 | Chang | ............... | H04W 12/0609 |
| 2017/0316497 A1* | 11/2017 | Song | ............... | H04L 9/3239 |
| 2018/0343118 A1* | 11/2018 | Funayama | ............... | H04L 9/3247 |
| 2019/0036924 A1* | 1/2019 | Wang | ............... | H04W 76/10 |
| 2019/0182237 A1* | 6/2019 | Queralt | ............... | H04L 9/3263 |

OTHER PUBLICATIONS

FIDO Alliance, Jun. 29, 2018, "FIDO Authenticator Allowed Restricted Operating Environments", pp. 1-4.*

FIDO Alliance, Jun. 29, 2018, "FIDO Authenticator Security Requirements", pp. 1-129.*

FIDO Alliance, Sep. 5, 2018, "FIDO Authenticator Security Requirements", pp. 1-128.*

FIDO Alliance, Aug. 2017, "FIDO Certification Program Policy", pp. 1-60.*

* cited by examiner

METHODS AND SYSTEMS FOR PROVIDING FIDO AUTHENTICATION SERVICES

CROSS REFERENCE TO RELATED APPLICATION(S)

This application claims the benefit of U.S. patent application Ser. No. 15/787,976, filed on Oct. 19, 2017, the contents of which are hereby incorporated by reference for all purposes.

FIELD OF THE INVENTION

Embodiments described herein generally relate to providing a variety of FIDO ("Fast IDentity Online") authentication services to clients. More particularly, embodiments described herein include an entity configured to provide different types of FIDO services to clients by virtue of acting as a façade or go-between to a variety of FIDO-certified providers.

BACKGROUND

More and more transactions involve a user operating a mobile device. A common example of a transaction is a payment transaction, which typically requires the user of a mobile device to provide information for security and/or authentication purposes. Many other types of transactions also require the use of authentication techniques, wherein the user may be required to provide a personal identification number ("PIN") or the like for authentication purposes when prompted. Due to an increase in fraud, it has become increasingly important to incorporate additional types and/or different types of authentication protocols for improved security when conducting transactions.

The use of passwords to authenticate users, such as consumers, endures despite the growing consensus that the use of passwords needs to be reduced or replaced. Effective public key infrastructure (PKI) and strong authentication solutions have existed for years, but barriers to widespread adoption persist. For example, consumers don't like the user experience associated with PKI and/or strong authentication services, and online service providers balk at the cost and complexity of developing and then provisioning their own dedicated solutions to user devices.

The FIDO ("Fast IDentity Online") Alliance was created to solve these problems, and has created specifications and certifications that enable the world's largest interoperable ecosystem of hardware-, mobile- and biometrics-based authenticators that can be used with many applications ("apps") and websites. This ecosystem includes more than 200 certified products and enables enterprises and service providers to deploy strong authentication solutions that reduce reliance on passwords and protect against phishing, man-in-the-middle attacks, and replay attacks using stolen passwords.

FIDO specifications have been developed that include a set of technology-agnostic security specifications for strong authentication. The FIDO specifications support a full range of authentication technologies, including biometric authenticators, such as fingerprints sensors, iris scanners, microphones (for voice recognition), and optical sensors or cameras (for facial recognition). The FIDO specifications also support existing solutions and communications standards, such as Trusted Platform Modules (TPM), USB security tokens, embedded Secure Elements (eSE), smart cards, and near-field communication (NFC). For example, a USB security token device may be used to authenticate using a simple password (such as a four-digit PIN) or by pressing a button. The FIDO specifications emphasize a device-centric model, and authentication over the wire happens using public key cryptography. The user's device registers the user to a server by registering a public key, and to authenticate the user, the device signs a challenge from the server using the private key that it holds. The keys on the device are unlocked by a local user gesture such as a biometric or pressing a button.

Thus, FIDO specifications support multifactor authentication (MFA) and public key cryptography. A major benefit of FIDO-compliant authentication is the fact that users don't need to use complex passwords, don't have to deal with complex strong password rules, and no longer have to endure recovery procedures which may be required of a user when a password is forgotten. Instead of using password databases, the FIDO specification requires personally identifying information (PII), such as biometric authentication data, to be stored locally on the user's device for security purposes. FIDO's local storage of biometrics and other personal identification eases user concerns about personal data being stored on an external server in the cloud, or in some other storage device. By abstracting the protocol implementation with application programming interfaces (APIs), FIDO also reduces the work required for developers to create secure logins for mobile clients running different operating systems (OSs) on different types of hardware.

FIDO specifications provide two categories of user experiences, depending on whether the user interacts with the Universal Authentication Framework (UAF) protocol or with the Universal Second Factor (U2F) protocol. With UAF, the client device creates a new key pair during registration with an online service, and then retains the private key. The public key is registered with the online service, and during authentication the client device proves possession of the private key to the service by signing a challenge. Signing a challenge typically involves a user-friendly action such as providing a fingerprint, entering a PIN, or speaking into a microphone. With U2F, user authentication requires a strong second factor such as a Near Field Communication (NFC) tap, or by connecting a USB security token to the user device. Both FIDO standards define a common interface at the client for the local authentication method that the user exercises. The client can be pre-installed on the operating system or web browser.

Due to the popularity and widespread acceptance and use of the FIDO specifications, FIDO-based authentication servers are becoming a commodity. Thus, many different vendors currently exist which offer FIDO-certified servers as an in-house and/or cloud based solution for clients. For example, one or more payment processing companies have implemented a FIDO server as part of an authentication platform, and therefore some embodiments include tight integration between a MasterCard™ Identity Server (MIS) core platform and a FIDO-certified server hosted on-premises. But if a vendor provides the FIDO server and/or FIDO services to a client, then there may be a strong reliance by the client on one partner (that vendor) which typically also entails licensing and integration costs. Alternately, if the client decides to rely on a custom-built FIDO server implementation, the client must be willing to shoulder FIDO certification costs and ongoing maintenance costs. Thus, it would be advantageous for an entity, such as a payment processing company, to be able to offer a variety of FIDO-certified services to clients in a cost-effective manner, wherein the clients are not required to rely on only one partner and/or are not required to host their own on-premises FIDO-certified server.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Reference will now be made in detail to various novel embodiments, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms are not intended to be limiting, but rather are used for convenience and ease of exposition. For example, as used herein, the term "user" may be used interchangeably with the term "consumer" or "cardholder" and such terms are used herein to refer to a consumer, person, individual, business or other entity that owns (or is authorized to use) a financial account such as a payment card account (for example, a credit card account). In addition, the term "payment card account" may include a credit card account, a debit card account, and/or a deposit account or other type of financial account that an account holder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related transactions, which may be operated by a payment card system operator such as MasterCard International Incorporated (the assignee of the present application), or a similar system. In some embodiments, the term "payment card system" may be limited to systems in which member financial institutions (such as banks) issue payment card accounts to individuals, businesses and/or other entities or organizations.

In general, and for the purpose of introducing concepts of novel embodiments described herein, disclosed are systems, apparatus and methods relating to providing a variety of FIDO authentication services to clients. In particular, disclosed embodiments include devices configured to provide different types of FIDO services to clients, which are offered by a variety of FIDO-certified providers. In some embodiments, an Identity Server computer system (such as a MasterCard™ Identity Server (MIS) computer system) is loosely coupled to a variety of different FIDO-certified providers, and provides routing services and/or brokerage services to efficiently and/or cost-effectively connect a particular client with a particular FIDO service provider (via a FIDO-certified server computer). In this manner, the client need not rely exclusively on one FIDO services partner, and in some implementations need not host and/or maintain an in-house FIDO-certified server.

Figure 1:
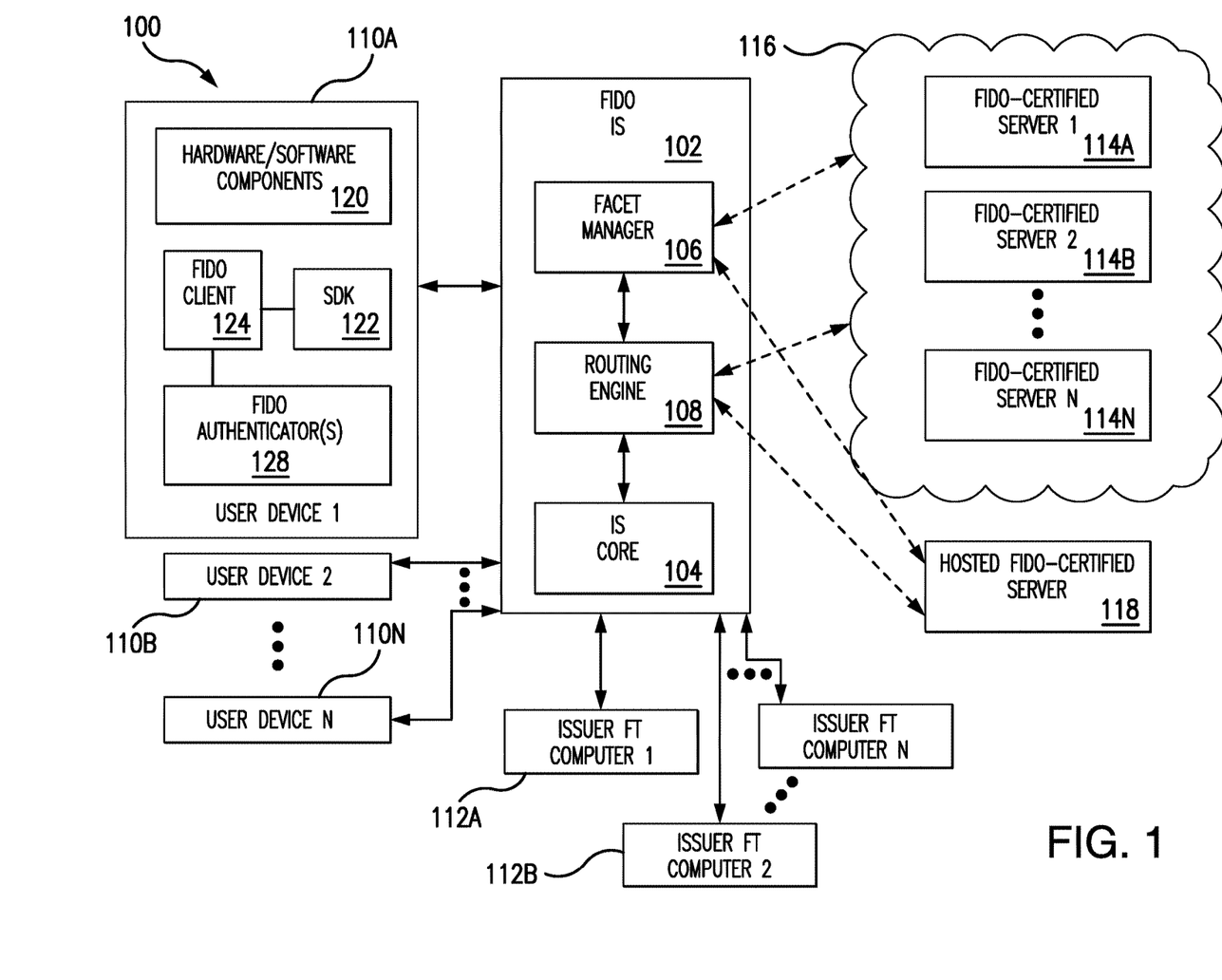
FIG. 1 is a block diagram illustrating a FIDO services routing system according to some embodiments of the disclosure.

FIG. 1 illustrates a FIDO services routing system 100 in accordance with some embodiments of the disclosure. The system 100 features a FIDO Identity Server (IS) 102 that includes an IS core component 104, a facet manager 106, and a routing engine 108. The components of the FIDO IS 102 are configured for communications with a plurality of user devices 110A, 110B to 110N, with a plurality of issuer financial institution (FI) computers 112A, 112B to 112N, with a plurality of FIDO-certified server computers 114A, 114B to 114N which may exist in a cloud system 116, and with a hosted FIDO-certified server 118. In order for an entity, such as a payments processing company, to act as a FIDO service provider, two endpoints must be exposed: a first endpoint to retrieve a list of trusted facets, and a second endpoint to register and authenticate devices and users, which is explained in more detail below.

In some embodiments, the IS core component 104 of the FIDO IS 102 is a processing device that is operable to register the issuer FI's 112A to 112N which desire to authorize use of FIDO services during transactions, for example. In some implementations, the IS core component 104 receives a list of trusted facets to associate with a specific issuer FI. Trusted facets and their role are defined in the "FIDO AppID and Facet Specification v1.0" promulgated by the FIDO Alliance and available on the Internet at the following address: https://fidoalliance.org/specs/fido-u2f-v1.0-ps20141009/fido-appid-and-facets-ps-20141009.html#the-appid-and-facetid-assertions.

For example, a user device may include payment applications "A1" and "A2" for a payment service (for example, for the PayPal™ service) and each such application has a different facet. The issuer financial institution (FI) that owns the payment applications "A1" and "A2" can configure the FIDO server so that only payment application "A1," or payment application "A2", or both "A1" and "A2" can utilize FIDO functionality.

In addition, the IS core component 104 accepts user device registration requests along with user authentication and/or device authentication requests. Accordingly, during a transaction, for example, a purchase transaction between a user (such as a cardholder) and a merchant, the IS core component 104 is responsible for basic device authentication and user verification. In addition, the IS core component 104 may present a configuration and administration interface to users. In some implementations, the IS facet manager 106 is responsible for maintaining the list of trusted facets associated with each issuer, and is responsible for providing an interface between the FIDO IS 102 and user devices 110A to 110N, so that native authenticators associated with each user device can retrieve the list of trusted facets.

Referring again to FIG. 1, in some embodiments the routing engine 108 is responsible for selecting the optimal FIDO-certified server present in the cloud 116 of FIDO-certified servers (wherein each of the FIDO-certified servers 114A to 114N has a contractual relationship with owner and/or operator of the FIDO IS 102). The routing engine 108 may also be responsible for dynamically adding and/or removing facets. With regard to determining and/or selecting an optimal FIDO certified server for an authentication service, the routing engine 108 may consider a variety of criteria and/or factors. For example, the routing engine 108 may base a selection of a particular FIDO-certified server based on one or more of Issuer FI requirements, authentication policies, the configured FIDO authenticators that are supported, and price. For example, a FIDO-certified Server associated with iris scan authentication may have exclusive rights to a specific type of iris authenticator (or iris scanner) that is found on a user device. Thus, when a request for user and/or device authentication is received from an issuer FI and that specific type of iris authentication is required, then the authentication request must be routed to the FIDO-certified Server associated with that iris scanner. In another example, a user authentication request may be received from an issuer FI that involves use of a fingerprint scanner, and in this case multiple FIDO-certified servers have the capability to provide the fingerprint authentication service. However, in this example the entity operating the FIDO IS 102 has an agreement with a particular FIDO-certified server 114B that provides fingerprint authentication services at low cost, and thus that user authentication request is routed (assuming all other considerations are equal) to FIDO-certified server 114B.

Referring again to FIG. 1, the routing engine 108 may also provide additional services, for example, when a FIDO-certified Server provider offers additional options for controlling one or more authenticators. The FIDO protocol provides extensions so that FIDO servers can control the behavior of authenticators. Accordingly, a FIDO server may be configured, for example, to remotely lock or unlock one or more authenticators, and/or to request additional data associated with one or more authenticators (for example, a FIDO server may be able to request a face matching score associated with a facial authenticator). While extensions are optional, they provide additional value-added services so that if one wants to utilize an extension, then FIDO messages must be routed appropriately by the routing engine 108 between the authenticator and the FIDO server. In some embodiments, the routing engine 108 is also configured to update the IS facet manager 106 with new application identifiers and/or with updates concerning the list of trusted facets and/or extensions. In addition, the routing engine 108 may forward subsequent registration and/or authentication messages to one or more of the FIDO-certified servers 114A to 114N.

In some embodiments, the user device 110A shown in FIG. 1 is a mobile device having hardware and/or software components 120 that provide functionality and/or operations in accordance with the characteristics of that type of mobile device. For example, if the mobile device is a smartphone, then it may include hardware components such as a touch screen display, a microphone, a speaker, a digital camera, controller circuitry, an antenna, and a memory or storage device (not shown) in addition to software configured to provide smartphone functionality. Storage devices utilized in the mobile devices and/or system components described herein may be composed of, or be any type of, non-transitory storage device that may store instructions and/or software for causing one or more processors of such electronic devices to function in accordance with the novel aspects disclosed herein. In some implementations, the mobile device 110A also includes a software development kit (SDK) 122 configured for communications with the IS core 104 and with a FIDO client 124, which is configured for communications with one or more FIDO authenticators 128. The mobile device 110A may also include additional logical and/or functional components such as, but are not limited to, a digital wallet application, a payment application, a biometric authentication application (or other software and/or middleware components to provide the functionality), and a hardware abstraction layer for permitting interaction with one or more of the FIDO authenticators 128, which may perform various different types of authentication. For example, the FIDO authenticators may include one or more of a fingerprint reader, a microphone, and/or a digital camera (not shown). For example, the microphone may be used to perform a user voice recognition process, and/or the digital camera may be utilized in some circumstances (for some types of transactions) to capture a photograph of the user's face to perform a facial recognition process or the like. It should be understood that some mobile devices can include two or more of such FIDO authenticators 128 in different combinations (for example, a smartphone may include a voice reader and a camera 116, but not a fingerprint reader, while other types of mobile devices may include all three of these devices). Moreover, some types of mobile devices may only include one type of authenticator, for example a microphone.

Figure 2:
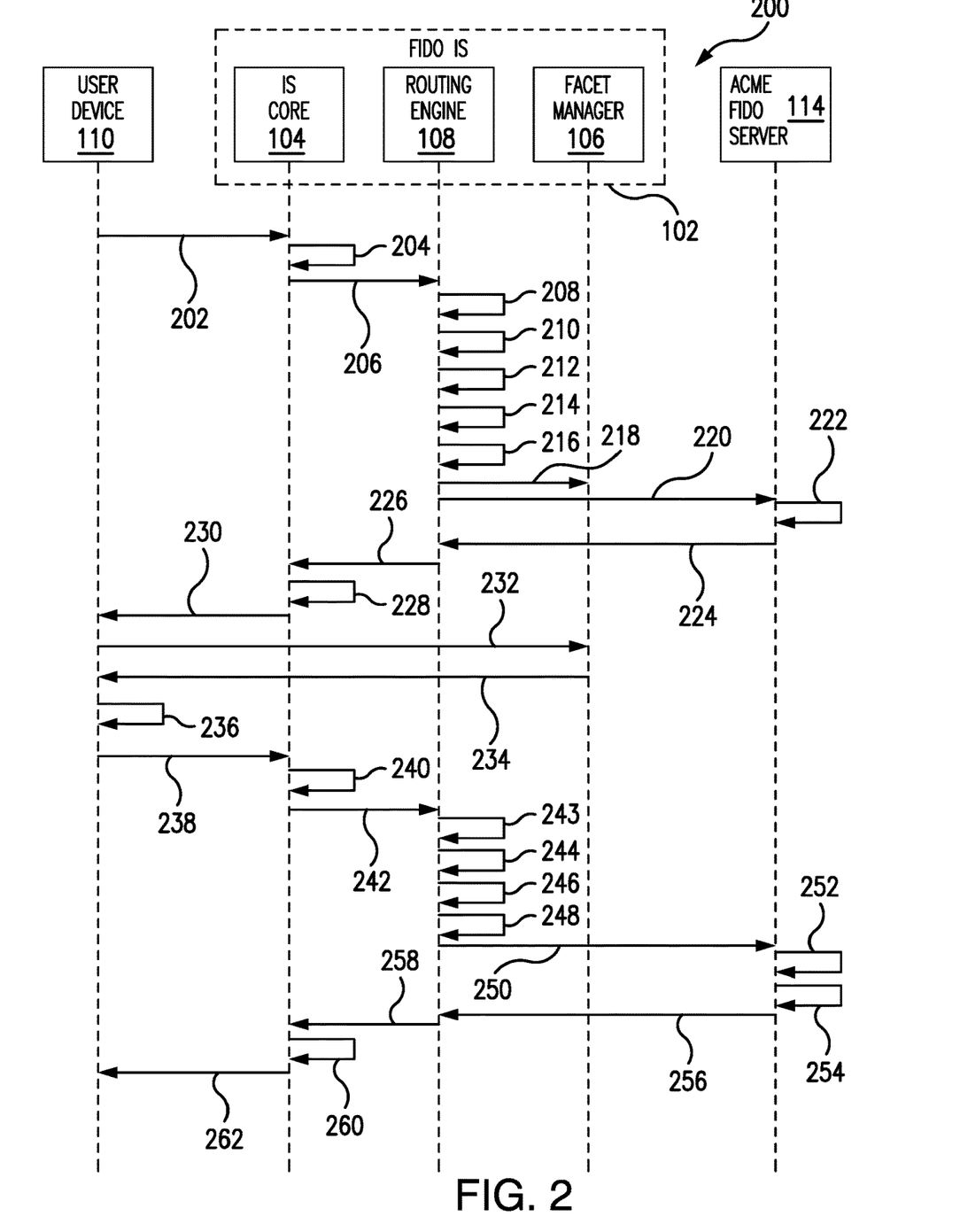
FIG. 2 is flow diagram illustrating a FIDO services user registration process in accordance with some embodiments of the disclosure.

FIG. 2 is flow diagram illustrating a FIDO services user registration process 200 in accordance with some embodiments. A user, such as a consumer and/or cardholder, wishing to register his or her user device 110 for FIDO authentication services interacts with the software development kit (SDK) 122 (see FIG. 1) running on the user's mobile device, which then discovers which type(s) of FIDO authenticators 128 are available. The user device 110 then transmits 202 a registration request to the IS core 104 that includes user data (such as a user identifier) and user device data (such as a device identifier), and including data that identifies the types of FIDO authenticators available. The IS core 104 then verifies 204 the user data and user device data by, for example, establishing that the payload structure is correct (for example, that it includes data presented in a predefined manner which includes a user identifier, a device identifier and the like), and by ensuring that the payload has arrived from a registered device. If all is in order, then the IS core 104 transmits 206 the registration request to the routing engine 108. The routing engine then retrieves 208 a list of authorized authenticators, selects 210 one or more business rules, selects 212 a FIDO-certified server from a plurality of such servers (in this example, the "ACME" FIDO server 114 is selected), which selected FIDO server can handle the authorized authenticators and satisfies the one or more business rules. The routing engine 108 also generates 214 a unique application identifier, generates 216 a correlation identifier, and transmits 218 an "update facets" command to the facet manager 106 (which command includes the unique application identifier and the FIDO facet). The correlation identifier is used to bind the FIDO registration request with a FIDO registration response, as the IS core routing logic needs to provide a mapping in order to correctly find where to send subsequent messages.

Referring again to FIG. 2, the routing engine also transmits 220 the registration request and the application identifier, the FIDO facet and the correlation identifier to the selected ACME FIDO-certified server 114. The ACME FIDO server 114 then generates 222 a challenge message which is based on the application identifier and FIDO facet, and transmits 224 the FIDO challenge message to the routing engine 108. The routing engine 108 then forwards 226 the FIDO challenge message to the IS Core 104, which performs 228 a secure process. In some implementations, the secure process entails encrypting the entire payload using a JavaScript object signing and encryption ("JOSE") standard, wherein JOSE is a framework intended to provide a method to securely transfer claims (such as authorization information) between parties. Thus, for every device a different private key will be used to ensure safe transmission of the data and to ensure that only one device (the correct device) can decrypt the data.

The FIDO services user registration process 200 next includes the IS Core 104 transmitting 230 the FIDO challenge message along with a registration response to the user device 110. The user device 110 then transmits 232 a request for a list of trusted facets to the facet manager 106, receives 234 the list of trusted assets, and verifies that the facet calculated for the application matches one of the facets from the trusted list. The user then interacts with the SDK of the user device 110 and provides FIDO authentication data (by interacting with one or more FIDO authenticators associated with the user's smartphone, for example) to satisfy the native authentication application (for example, a biometric application requiring fingerprint data from a FIDO fingerprint reader component). The user then utilizes the user device 110 to transmit 238 the registration response to the IS core 104, which then verifies 240 the payload (which includes a Universal Authentication Framework (UAF) registration response along with data such as the user identifier and the device identifier for consumption by the IS core 104). The IS core then transmits 242 the registration response to the routing engine 108. The routing engine 108 then retrieves 243 the FIDO registration response, retrieves 244 the application identifier, locates 246 the correlation identifier, selects 248 the ACME FIDO-certified server 114, and then transmits 250 the registration response and the correlation identifier to the ACME FIDO-certified server 114. The ACME FIDO-certified server 114 then retrieves 252 the FIDO facet and the authentication identifier, conducts 254 a verification process (as explained above), and transmits 256 the registration result to the routing engine 108, which forwards 258 the registration result to IS core 104. The IS core 104 then conducts 260 secure processing (as explained above) and transmits 262 the registration result to the user device 110, which typically then displays a "registration successful" message to the user on a display component.

It should be understood that a user may register a number of devices pursuant to the processes presented herein. For example, the same user may register a smartphone, tablet computer and a laptop computer with the FIDO IS 102 (shown in FIG. 1) for FIDO authentication services as described herein. Further, once the user has registered a particular device and its associated FIDO authenticators, that registration data may be used to authenticate a user with regard to different type of transactions, which may also involve different transaction methods. In addition, in some embodiments the user can register multiple devices and each such user device can be associated with the same biometric dataset so that any of those registered devices can be used in transactions requiring user authentication.

Figure 3:
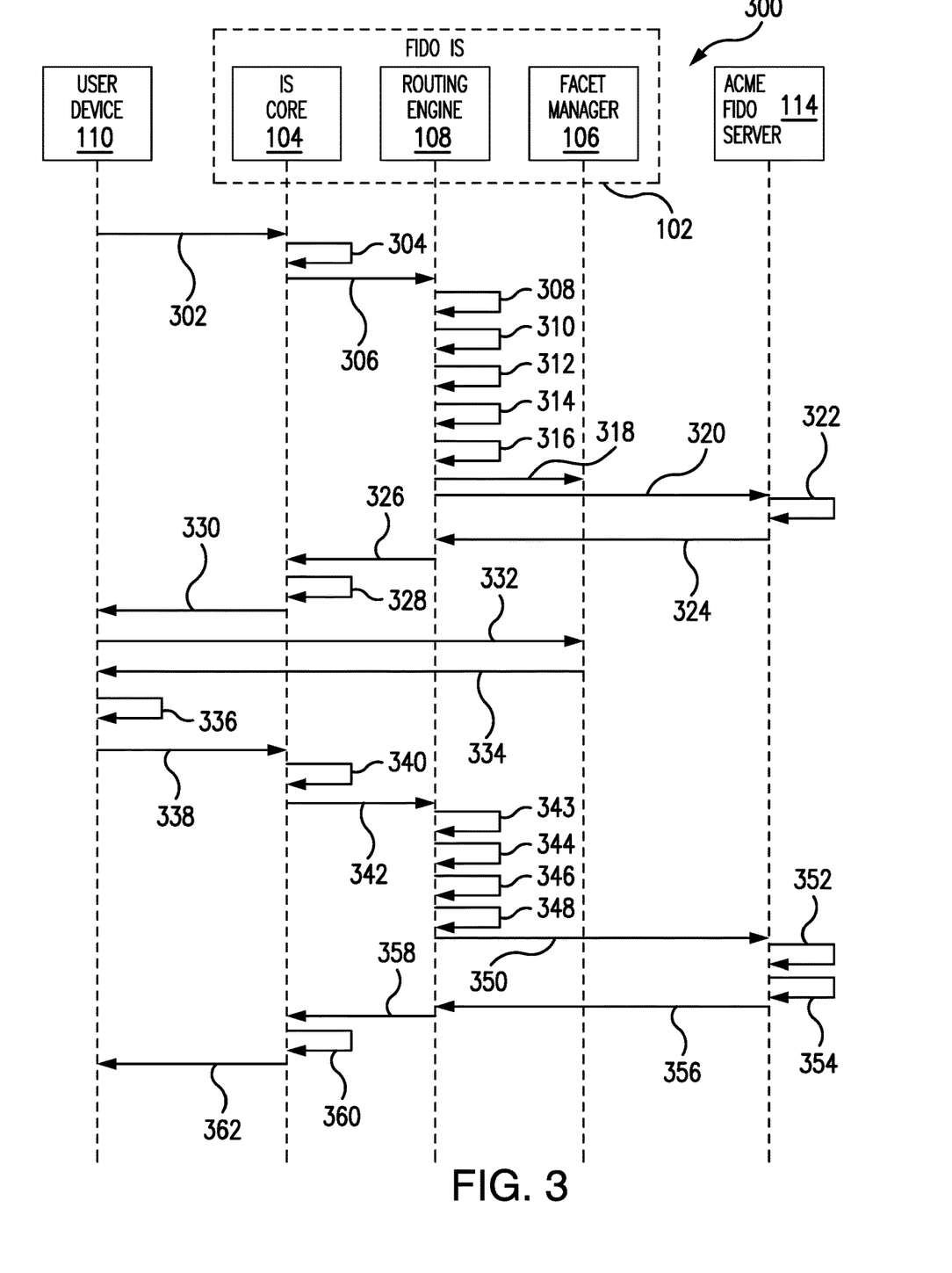
FIG. 3 is flow diagram illustrating a FIDO services authentication process in accordance with some embodiments of the disclosure.

FIG. 3 is flow diagram illustrating a FIDO services authentication process in accordance with some embodiments of the disclosure. A user wishing to conduct a transaction, for example, interacts with the SDK (see FIG. 1) which discovers which type(s) of FIDO authenticators 128 are available. The user device 110 then transmits 302 an authentication request to the IS core 104 that includes user data and user device data, including the data that identifies the types of FIDO authenticators available. The IS core 104 then verifies 304 the user data and user device data by, for example, establishing that the payload structure is correct (for example, that it includes data presented in a predefined manner which includes a user identifier, a device identifier and the like), and by ensuring that the payload has arrived from a registered device. If all is in order, then the IS core 104 transmits 306 the authentication request to the routing engine 108. The routing engine then retrieves 308 a list of authorized authenticators, selects 310 one or more business rules, selects 312 a FIDO-certified server from a plurality of such servers (in this example, the "ACME" FIDO server 114 is selected), which selected FIDO server can handle the authorized authenticators and satisfies the one or more business rules. The routing engine 108 also retrieves 314 the application identifier (which should match the application identifier generated during the registration process), generates 316 a correlation identifier, and transmits 318 an "update facets" command to the facet manager 106 (which includes the unique application identifier and the FIDO facet). The correlation identifier is used to bind the FIDO registration request with a FIDO registration response, as the IS core routing logic needs to provide a mapping in order to correctly find where to send subsequent messages.

Referring again to FIG. 3, the routing engine also transmits 320 the authentication request and the application identifier, the FIDO facet, and the correlation identifier to the selected ACME FIDO-certified server 114. Next the ACME FIDO server 114 generates 322 a challenge message which is based on the application identifier and FIDO facet, and transmits 324 the FIDO challenge message to the routing engine 108. The routing engine 108 then forwards 326 the FIDO challenge message to the IS Core 104, which performs 328 a secure process. As explained above, the secure process may entail encrypting the entire payload using a JavaScript object signing and encryption ("JOSE") standard, wherein JOSE is a framework intended to provide a method to securely transfer claims (such as authorization information) between parties. Thus, for every device a different private key will be used to ensure safe transmission of the data and to ensure that only one device (the correct device) can decrypt the data.

The FIDO services authentication process next includes the IS core 104 transmitting 330 the FIDO challenge message along with an authentication response to the user device 110. The user device 110 then transmits 332 a request for a list of trusted facets to the facet manager 106, receives 334 the list of trusted assets, verifies and/or captures 336 biometric data and provides an authentication response to the user. The user then interacts with the SDK of the user device 110 and provides FIDO authentication data (by interacting with one or more FIDO authenticators associated with the user's smartphone, for example) to satisfy the native authentication application (for example, a biometric application requiring fingerprint data from a FIDO fingerprint reader component). The user then utilizes the user device 110 to transmit 338 the authentication response to the IS core 104, which then verifies 340 the payload (which includes a Universal Authentication Framework (UAF) authentication response along with data such as the user identifier and the device identifier for consumption by the IS core 104). The IS core 104 then transmits 342 the authentication response to the routing engine 108.

The routing engine 108 then retrieves 343 the FIDO authentication response, retrieves 344 the application identifier, locates the correlation identifier 346, selects 348 the ACME FIDO-certified server 114, and then transmits 350 the authentication response and the correlation identifier to the ACME FIDO-certified server 114. The ACME FIDO-certified server 114 then retrieves 352 the FIDO facet and the authentication identifier, conducts 354 a verification process (as explained above), and transmits 356 the authentication result to the routing engine 108, which forwards 258 the authentication result to IS core 104. The IS core 104 then conducts 260 secure processing (as explained earlier), and transmits 362 the authentication result to the user device 110, which typically then displays an "authentication successful" message to the user on a display component. When the user and/or user device has been authenticated in this manner, the transaction can then be consummated.

It should be understood that, in some implementations, more than one form of user biometric data may be required from the user for authentication purposes in accordance with business rules and the like associated with a particular type of transaction. For example, if a consumer is attempting to purchase an expensive item from an online merchant (for example, a wristwatch valued at more than one thousand dollars) then in addition to voice data, an issuer financial institution, for example, may enforce a business rule that requires the user to provide one or more additional forms of biometric data, such as photographic data representing the user's face and/or a user password or personal identification number (PIN).

Figure 4A:
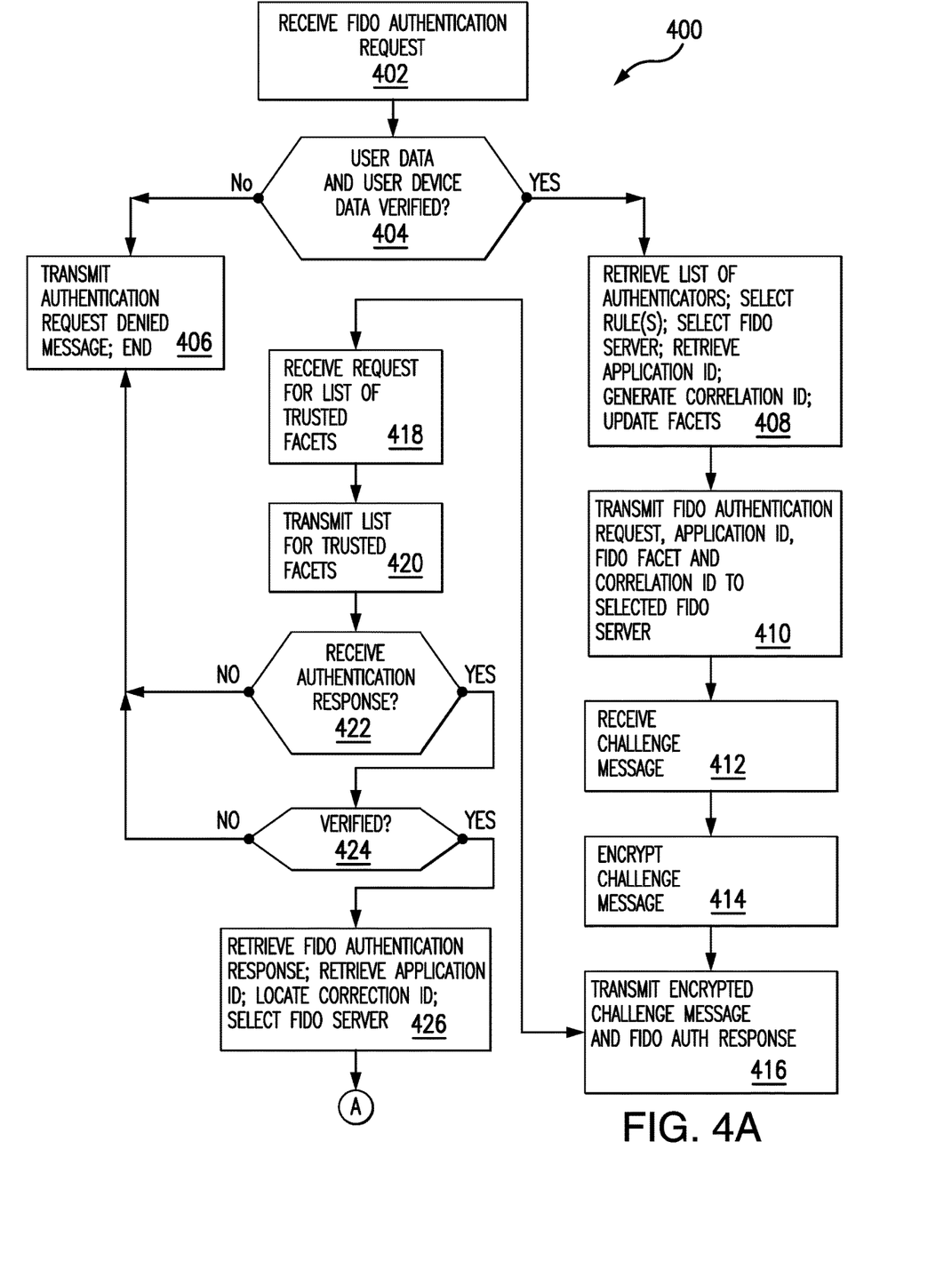
FIGS. 4A and 4B together form a flowchart illustrating a FIDO ("Fast IDentity Online") authentication process according to some embodiments of the disclosure.
Figure 4B:
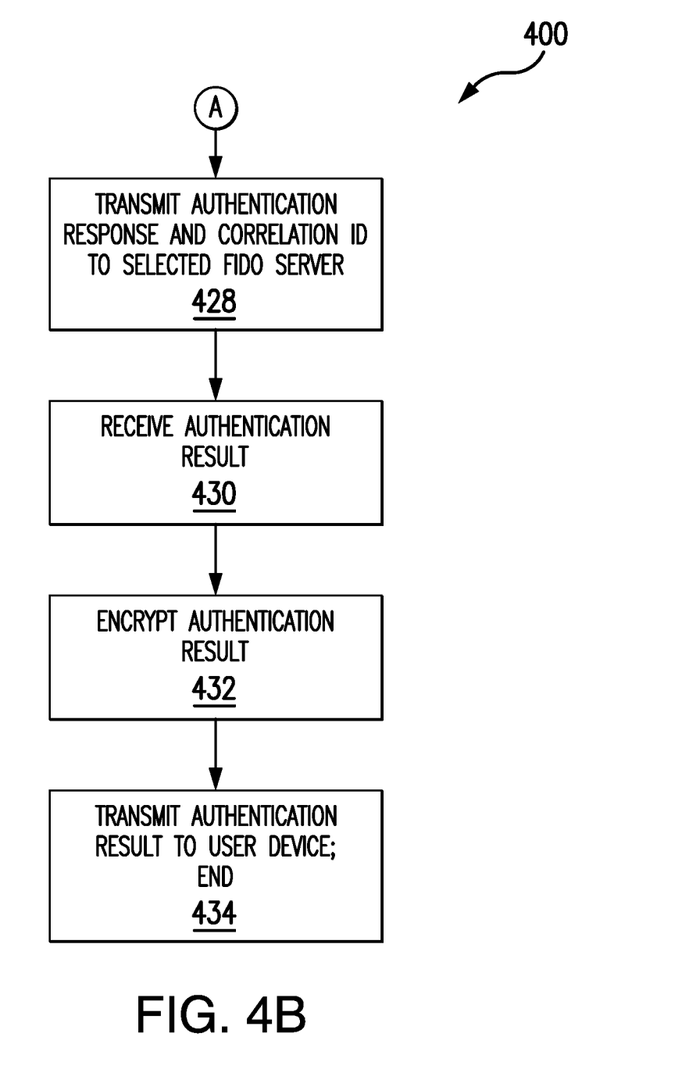

FIGS. 4A and 4B together form a flowchart illustrating a FIDO ("Fast IDentity Online") authentication process 400 in accordance with embodiments described herein. A FIDO IS computer system receives 402 an authentication request from a user device that includes user data and user device data, which includes data identifying the types of FIDO authenticators available on the user's device (which may be, for example, a mobile device such as a smartphone). If the FIDO IS computer system cannot verify the user data and user device data in step 404, then the FIDO IS computer system transmits 406 an authentication request denied message to the user's device and the process ends. However, if in step 404 the FIDO IS computer system verifies the user data and user device data, then the process continues. In some embodiments, the FIDO IS computer system verifies the user data and user device data by, for example, establishing that the payload structure is correct (for example, that it includes data presented in a predefined manner which includes a user identifier, a device identifier and the like), and by ensuring that the payload has arrived from a registered device.

Referring again to FIG. 4, after the user data and user device data is verified, the FIDO IS computer system then retrieves 408 a list of authorized authenticators, selects one or more business rules (which may have been specified, for example, by an issuer financial institution of an account held by the user), selects a FIDO-certified server from a plurality of such servers (which selected FIDO server can handle the authorized authenticators and which satisfies the one or more business rules), and retrieve the application identifier (which should match the application identifier generated during the registration process). The FIDO IS computer system also generates a correlation identifier, and processes an update facets command (which includes the unique application identifier and the FIDO facet). Next, the FIDO IS computer system transmits 410 the authentication request and the application identifier, the FIDO facet, and the correlation identifier to the selected FIDO-certified server. The FIDO IS computer system then receives 412 a challenge message from the selected FIDO-certified server (which challenge message is based on the application identifier and FIDO facet. The FIDO IS computer system then encrypts 414 the entire payload of the challenge message by, for example, using a JavaScript object signing and encryption ("JOSE") standard, and transmits 416 the encrypted challenge message along with an authentication response to the user device.

Next, the FIDO IS computer system receives 418 a request for a list of trusted facets from the user device, and then transmits 420 the list trusted assets to the user device. Next, in step 422, if the FIDO IS computer system does not receive an authentication response within a predetermined amount of time, then the FIDO IS computer system transmits 406 an authentication request denied message to the user device, and the process ends. But if the authentication response is received within the predetermined amount of time, then the FIDO IS computer system verifies 424 the payload of the authentication response (which includes a Universal Authentication Framework (UAF) authentication response along with data such as the user identifier and the device identifier) before proceeding. If the authentication response cannot be verified in step 424, then the FIDO IS computer system transmits 406 an authentication request denied message to the user device, and the process ends. But if in step 424 the authentication response received from the user device is verified, then the FIDO IS computer system retrieves 426 the FIDO authentication response, retrieves the application identifier, locates the correlation identifier, and selects the FIDO-certified server.

Referring to FIG. 4B, the FIDO IS computer system next transmits 428 the authentication response and the correlation identifier to the selected FIDO-certified server. Next, the FIDO IS computer system receives 430 an authentication result from the FIDO-certified server, encrypts 432 the authentication result, and transmits 434 the encrypted authentication result to the user device, and the process ends. When the authentication process is successful, in some embodiments the user device displays an "authentication successful" message to the user on a display component.

The processes, apparatus and systems disclosed herein offers an entity, such as a payment processor company, a unique opportunity to act as the main provider for all FIDO-certified and/or FIDO-related functions for clients without having to implement and/or maintain any FIDO business logic and/or FIDO-certified servers. Such an entity thus functions as a broker to offer issuers access to FIDO services that are usually provided by the third parties at higher cost.

As used herein and in the appended claims, the term "computer" should be understood to encompass a single computer or two or more computers in communication with each other. Also, as used herein and in the appended claims, the term "processor" should be understood to encompass a single processor or two or more processors in communication with each other. In addition, as used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of steps, and/or in an order that omits one or more steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A FIDO ("Fast IDentity Online") authentication process, comprising:
   receiving, by a FIDO information systems (IS) computer system from a user device, a FIDO authentication request for a transaction, the FIDO authentication request comprising user data and user device authenticator data;
   verifying, by the FIDO IS computer system, the user data and user device authenticator data;
   selecting, by the FIDO IS computer system, a FIDO-certified server based on a list of authorized authenticators, business rules and the user device authenticator data;
   transmitting, by the FIDO IS computer system to the selected FIDO server, the FIDO authentication request;
   receiving, by the FIDO IS computer system, an authentication result from the FIDO-certified server; and
   transmitting, by the FIDO IS computer system to the user device, the authentication result.

2. The method of claim 1, further comprising, prior to receiving the authentication result from the FIDO certified server:
   receiving, by the FIDO IS computer system from the selected FIDO-certified server, a FIDO challenge message;
   encrypting, by the FIDO IS computer system, the FIDO challenge message;
   transmitting, by the FIDO IS computer system, the encrypted FIDO challenge message to the user device;
   receiving, by the FIDO IS computer system from the user device in response to the encrypted FIDO challenge message, a FIDO authentication response; and
   transmitting, by the FIDO IS computer system, the FIDO authentication response to the selected FIDO-certified server.

3. The method of claim 1, further comprising, prior to transmitting the FIDO authentication request:
   retrieving, by the FIDO IS computer system, an application identifier;
   generating, by the FIDO IS computer system, a correlation identifier; and
   transmitting, by the FIDO IS computer system, the application identifier and the correlation identifier along with the FIDO authentication request to the selected FIDO-certified server.

4. The method of claim 3, further comprising, after receiving the FIDO authentication response from the user device in response to the encrypted challenge message:
   retrieving, by the FIDO IS computer system, the FIDO authentication response, the application identifier, and the correlation identifier; and
   transmitting, by the FIDO IS computer system, the application identifier and the correlation identifier along with the FIDO authentication response to the selected FIDO-certified server.

5. The method of claim 1, further comprising, after verifying the user data and user device authenticator data, updating a list of trusted FIDO facets.

6. The method of claim 1, wherein the FIDO authentication request is received from one of a web browser or an application running on the user's device.

7. The method of claim 1, wherein verifying the user data and user device authenticator data comprises:
   establishing, by the FIDO IS computer system, that a payload structure of FIDO authenticator request includes at least a user identifier and a device identifier; and
   determining, by the FIDO IS computer system, that the payload was received from a registered user device.

8. The method of claim 2, further comprising providing, by the FIDO IS computer system, extension services to the selected FIDO-certified server.

9. The method of claim 8, wherein receiving the FIDO challenge message from the selected FIDO-certified server further comprises receiving, by the FIDO IS computer system, at least one of an extension command and an extension request; and
   transmitting, by the FIDO IS computer system, the encrypted FIDO challenge message and the at least one of the extension command and the extension request to the user device.

10. An FIDO ("Fast IDentity Online") authentication system comprising:
    a plurality of user mobile devices each comprising at least one FIDO authenticator;
    a plurality of FIDO-certified servers;
    a plurality of issuer financial institution (FI) computers; and
    a FIDO IS computer system in communication with the plurality of user mobile devices, the plurality of FIDO-certified servers, and the plurality of issuer FI computers, wherein the FIDO IS computer system comprises a facet manager operably connected to a routing engine and to an IS core, and wherein the FIDO IS computer system is configured to:
    receive a FIDO authentication request for a transaction from a user device, the FIDO authentication request comprising user data and user device authenticator data;
    verify the user data and user device authenticator data;
    select a FIDO-certified server based on a list of authorized authenticators, business rules and the user device authenticator data;
    transmit the FIDO authentication request to the selected FIDO server;
    receive an authentication result from the FIDO-certified server; and
    transmit the authentication result to the user device.

11. The system of claim 10, wherein, prior to receiving the authentication result from the FIDO certified server, the FIDO IS computer system is further configured to:
    receive a FIDO challenge message from the selected FIDO-certified server;
    encrypt the FIDO challenge message;

transmit the encrypted FIDO challenge message to the user device;
receive a FIDO authentication response from the user device in response to the encrypted FIDO challenge message; and
transmit the FIDO authentication response to the selected FIDO-certified server.

12. The system of claim 10, wherein the FIDO IS computer system is further configured to:
retrieve an application identifier;
generate a correlation identifier; and
transmit the application identifier and the correlation identifier along with the FIDO authentication request to the selected FIDO-certified server.

13. The system of claim 12, wherein the FIDO IS computer system is further configured to, after receiving the authentication response from the user device in response to the challenge message:
retrieve the FIDO authentication response, the application identifier, and the correlation identifier; and
transmit the application identifier and the correlation identifier along with the FIDO authentication response to the selected FIDO-certified server.

14. The system of claim 10, wherein the FIDO IS computer system is further configured to, after verifying the user data and user device data, update a list of trusted FIDO facets.

15. The system of claim 10, wherein the FIDO IS computer system is further configured receive the FIDO authentication request from one of a web browser or an application running on the user's device.

16. The system of claim 10, wherein, when verifying the user data and user device authenticator data, the FIDO IS computer system is further configured to:
establish that a payload structure of FIDO authenticator request includes at least a user identifier and a device identifier; and
determine that the payload was received from a registered user device.

17. The system of claim 11, wherein the FIDO IS computer system is further configured to provide extension services to the selected FIDO-certified server.

18. The system of claim 17, wherein the FIDO IS computer system is further configured to, when receiving the FIDO challenge message from the selected FIDO-certified server:
receive at least one of an extension command and an extension request; and
transmit the encrypted FIDO challenge message and the at least one of the extension command and the extension request to the user device.

* * * * *